United States Patent
Koo

(10) Patent No.: US 8,064,381 B2
(45) Date of Patent: Nov. 22, 2011

(54) METHOD OF CONTROLLING UPLINK OUTPUT POWER IN A WIRELESS COMMUNICATION SYSTEM

(75) Inventor: Hyoun Hee Koo, Gwangju (KR)

(73) Assignee: LG Electronics, Inc., Seoul (KR)

( * ) Notice: Subject to any disclaimer, the term of this patent is extended or adjusted under 35 U.S.C. 154(b) by 1031 days.

(21) Appl. No.: 11/840,152

(22) Filed: Aug. 16, 2007

(65) Prior Publication Data

US 2008/0043662 A1 Feb. 21, 2008

(30) Foreign Application Priority Data

Aug. 16, 2006 (KR) .......................... 10-2006-076986

(51) Int. Cl.
*H04B 7/185* (2006.01)
(52) U.S. Cl. .... 370/318; 455/13.4; 455/522; 455/432.1; 455/318; 455/436
(58) Field of Classification Search .................. 455/13.4, 455/522, 127.1, 318, 432.1, 436–442
See application file for complete search history.

(56) References Cited

U.S. PATENT DOCUMENTS

| | | | |
|---|---|---|---|
| 2002/0068581 A1* | 6/2002 | Salonaho ...................... 455/456 |
| 2002/0173270 A1 | 11/2002 | Buer | |
| 2003/0054850 A1* | 3/2003 | Masseroni et al. ............ 455/522 |
| 2004/0081248 A1* | 4/2004 | Parolari ........................ 375/259 |
| 2006/0281414 A1* | 12/2006 | Lindoff et al. ............. 455/67.11 |
| 2007/0010253 A1* | 1/2007 | Gunnarsson et al. ......... 455/442 |
| 2007/0223599 A1* | 9/2007 | Sheng et al. .................. 375/259 |
| 2007/0265757 A1* | 11/2007 | Kawasaki ....................... 701/51 |

FOREIGN PATENT DOCUMENTS

| | | |
|---|---|---|
| CA | 2367250 | 7/2002 |
| EP | 1432143 | 6/2004 |
| JP | 10501391 | 2/1998 |
| JP | 2006517067 | 7/2006 |
| RU | 2251220 | 4/2005 |
| WO | 9953630 | 10/1999 |
| WO | 2006077647 | 7/2006 |

\* cited by examiner

*Primary Examiner* — Kamran Afshar
*Assistant Examiner* — Edward Zhang
(74) *Attorney, Agent, or Firm* — Lee, Hong, Degerman, Kang & Waimey

(57) ABSTRACT

A method of calculating uplink output power in a wireless communication system is disclosed. More specifically, the method includes receiving a message which includes a command to a mobile station (MS) to perform handover from a current serving cell to a target cell, which is one of neighbor cells, performing handover to the target cell according to the message, measuring power of a downlink transmission channel in the target cell, and calculating the uplink output power by using only the measured power and without considering previous measured powers from the current serving cell if the measured power is used for a first calculation to obtain the uplink output power after the MS moves to the target cell.

12 Claims, 4 Drawing Sheets

METHOD OF CONTROLLING UPLINK
OUTPUT POWER IN A WIRELESS
COMMUNICATION SYSTEM

This application claims the benefit of Korean Application No. 10-2006-076986, filed on Aug. 16, 2006, which is hereby incorporated by reference.

BACKGROUND OF THE INVENTION

1. Field of the Invention

The present invention relates to a method of controlling power, and more particularly, to a method of controlling uplink output power in a wireless communication system.

2. Discussion of the Related Art

Global System for Mobile Communication (GSM) was developed to bring together different communication systems in Europe. Further, General Packet Radio Service (GPRS) introduced packet switched data into GSM systems. The GPRS provides packet data service which means that multiple users can share the same transmission channel, only transmitting when there is data to send. GSM can be referred to as circuit-switched data service which establishes a radio resource (RR) connection and reserves the full bandwidth of that circuit-switched data during the lifetime of the RR connection. The difference with packet data service is that the packet data service can have total available bandwidth dynamically dedicated to those users who are actually sending at any given moment, providing higher utilization where users only send or receive data intermittently.

Enhanced Data Rate for GSM Evolution (EDGE) introduced 8-phase shift keying (8-PSK) into GSM/GPRS networks. EDGE can use 8-PSK as well as Gaussian Minimum Shift Keying (GMSK) of GSM as the modulation scheme. With an exception of modulation scheme of GPRS, most of non-modulation techniques of GPRS can be applied to EDGE.

Further, EDGE includes two enhanced data rates, and they are an enhanced circuit switched data service (ECSD) and an enhanced packet switched data service which is also referred to as enhanced GPRS (EGPRS). Because implementation of ECSD is regarded as impractical in the real world, EDGE can be regarded as EGPRS.

EDGE is a superset to GPRS and can function on any network with GPRS deployed on it, provided that the operator of GSM/GPRS networks implements the necessary upgrades. Further, EDGE uses different modulation and/or coding schemes such as MCS1 to MCS9 from CS1 to CS4 used for GSM/GPRS networks so as to optimize the transmission rate.

GSM/GPRS/EDGE is based on a time division multiple access (TDMA) as an access technology. In the system, a communication between a base station subsystem (BSS) and a mobile station (MS) takes place in form of time slots. Here, transmission from the BSS to the MS is referred to as downlink transmission, and the transmission from the MS to the BSS is referred to as uplink transmission GPRS is different from the older circuit-switched data (CSD) connection included in GSM standards. In CSD, a data connection establishes a circuit, and reserves the full bandwidth of that circuit during the lifetime of the connection. GPRS is packet-switched which means that multiple users share the same transmission channel, only transmitting when they have data to send. This means that the total available bandwidth can be immediately dedicated to those users who are actually sending at any given moment, providing higher utilization where users only send or receive data intermittently. Web browsing, receiving e-mails as they arrive and instant messaging are examples of uses that require intermittent data transfers, which benefit from sharing the available bandwidth.

With mobility of mobile devices using the GPRS system, it is important that services are provided effectively and efficiently between the network and the mobile device.

SUMMARY OF THE INVENTION

Accordingly, the present invention is directed to a method of controlling uplink output power in a wireless communication system that substantially obviates one or more problems due to limitations and disadvantages of the related art.

An object of the present invention is to provide a method of calculating uplink output power in a wireless communication system.

Another object of the present invention is to provide a method of calculating uplink output power for cell re-selection in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of calculating uplink output power in a wireless communication system includes receiving a message which includes a command to a mobile station (MS) to perform handover from a current serving cell to a target cell, which is one of neighbor cells, performing handover to the target cell according to the message, measuring power of a downlink transmission channel in the target cell, and calculating the uplink output power by using only the measured power and without considering previous measured powers from the current serving cell if the measured power is used for a first calculation to obtain the uplink output power after the MS moves to the target cell.

In another aspect of the present invention, a method of calculating uplink output power for cell re-selection in a wireless communication system includes changing a serving cell from a current serving cell to a target cell, which is one of neighbor cells, measuring power of a downlink transmission channel in the target cell, and calculating the uplink output power by using only the measured power and without considering previous measured powers from the current serving cell if the measured power is used for a first calculation to obtain the uplink output power after the MS moves to the target cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
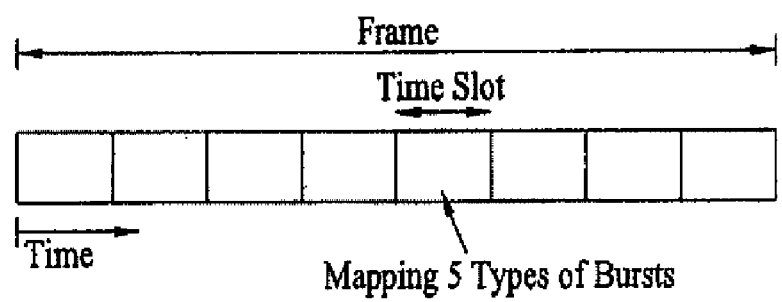
FIG. 1 is an exemplary diagram of a frame.

Reference will now be made in detail to the preferred embodiments of the present invention, examples of which are illustrated in the accompanying drawings. Wherever possible, the same reference numbers will be used throughout the drawings to refer to the same or like parts.

In the GSM/GPRS/EDGE wireless communication environment, the MS periodically measures signal level/strength and signal quality of its serving cell. The measured signal level/strength and/or signal quality can be used for various purposes, and in particular, this information can be used for calculating uplink output power.

The uplink output power in the GSM/GPRS/EDGE communication system can be calculated by various means, one of which is to use normalized control information based on measured signal level/strength. The control information is defined as variable C (hereinafter "C value") in 3GPP 45.008 10.2.3.1.

The MS in packet idle mode can periodically measure received signal level of a packet common control channel (PCCCH) and/or a packet broadcast control channel (PBCCH). If the PBCCH is not provided or available in a serving cell (e.g., the cell in which the MS is currently located), the MS can measure the signal level of a common control channel (CCCH) or a broadcast control channel (BCCH).

Conventionally, the C value has been computed in packet idle mode and packet transfer mode. The C value can be calculated in packet idle mode or packet transfer mode (MAC-idle state or MAC-shared state) to obtain MS output power value or uplink power value in GPRS/EDGE systems. Further, although the C value can be considered as a variable value according to the received signal level in calculating uplink power value in packet transfer mode, the C value can be measured in other mode(s) (e.g., packet idle mode, dual transfer mode, or dedicated mode) as well in order to reflect unpredictable radio channel environment more exactly since the MS can transit between modes.

The C value is affected by the communication environment (e.g., channel condition), and hence, the C value can be updated periodically. With respect to calculation of the C value, $n^{th}$ updated C value can be expressed as $C_n$. Here, $C_n$ can be updated by a normalized C value (i.e., $C_{block,n}$) of a radio block and a preceding C value (i.e., $C_{n-1}$). The normalized C value or $C_{block,n}$ can be calculated using the following equation.

$$C_{block,n} = SS_{block,n} + Pb \quad \text{[Equation 1]}$$

In Equation 1, $SS_{block,n}$ denotes the mean of the received signal level of a plurality of normal bursts (e.g., four (4) normal bursts) that compose the radio block. Moreover, Pb is a value of base transceiver station (BTS) output power reduction (relative to the output power used on broadcast control channel) used on the channel on which the measurements are performed. Lastly, $C_{block,n}$ value is filtered with a running average filter. Equation 2 is an example of a running average filter.

$$C_n = (1-a)^* C_{n-1} + a^* C_{block,n} \quad \text{[Equation 2]}$$

In Equation 2, a represents forgetting factor, and n denotes iteration index. Here, a=1 for n=1. Every time a new cell is selected, the value of n in the first sample is 1. In other words, the filter can be restarted with n=1 for the first sample every time a new cell is selected. Furthermore, if the MS transitions from a packet transfer mode to the packet idle mode (or MAC-idle state), filtering can continue using n and $C_n$ values obtained during the packet transfer mode (or MAC-shared state).

FIG. 1 is an exemplary diagram of a frame. Referring to FIG. 1, a frame used in the GSM/GPRS/EDGE system is comprised of eight (8) time slots, and each time slot can be assigned to respectively different MSs.

Figure 2:
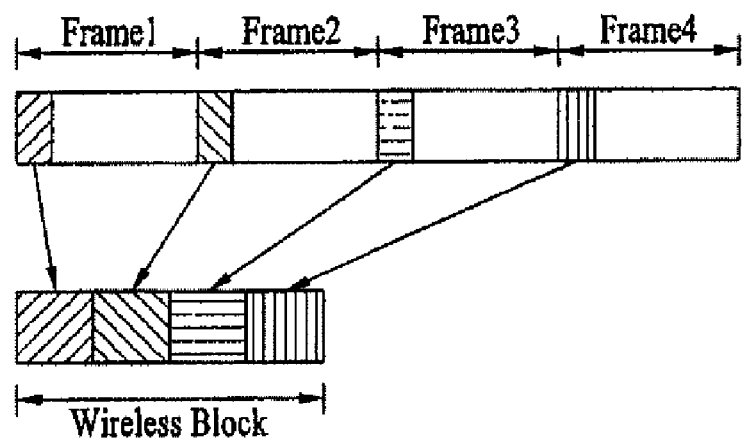
FIG. 2 is an exemplary diagram of a wireless block.

FIG. 2 is an exemplary diagram of a wireless block. Referring to FIG. 2, the wireless block is comprised of time slots allocated to specific MSs with respect to each frame. In other words, if the MS receives four (4) frames (Frame 1-Frame 4), the wireless block can be referred to as a combination of time slots of each frame allocated to specific MSs. Here, each time slot of a frame can be mapped to five (5) different types of bursts, and a normal burst is one of the five (5) burst types. Moreover, as discussed with respect to Equation 1, $SS_{block,n}$ denotes the mean of the received signal level of the four (4) normal bursts that compose the radio block.

In the packet transfer mode, the C value can be updated by measuring the received signal level of the BCCH or by measuring the received signal level of a packet data channel (PDCH).

The C value can be calculated when the MS is in packet transfer mode (or MAC-shared state). That is, the MS in packet transfer mode (or MAC-shared state) can use the same received signal level measurements used for cell reselection on the BCCH carrier of the serving cell to calculate $C_n$ values. The received signal level of the BCCH carrier can be filtered according to the following equation.

$$C_n = (1-b)^* C_{n-1} + b^* SS_n \quad \text{[Equation 3]}$$

Referring to Equation 3, $SS_n$ is the received signal level of the measurement samples, b denotes forgetting factor, and n is the iteration index. Here, b=1 for n=1. If the MS enters packet transfer mode from packet idle mode, the filter can continue from n and $C_n$ values obtained during packet idle mode (or MAC-idle state).

Alternatively, $C_n$ values can be calculated by the MS by measuring the received signal level of the PDCH. If PDCH is measured, $C_n$ value can be calculated using $C_{block,n}$ derived according to Equation 1. Equation 4 illustrates running average filter used for calculating $C_n$ value.

$$C_n = (1-c)^* C_{n-1} + c^* C_{block,n} \quad \text{[Equation 4]}$$

Referring to Equation 4, c is the forgetting factor, and n denotes iteration index. Here, c=1 for n=1. If the MS enters packet transfer mode from packet idle mode, the filter can continue from n and $C_n$ values obtained during packet idle mode (or MAC-idle state).

If the MS in packet transfer mode remains in the serving cell and the network entity does not perform downlink power control, the frequency (or carrier) used for downlink transmission can change according to the network entity determination. However, according to the conventional practice, it is unclear as to how to calculate $C_n$ value which is necessary for determining the uplink output power.

In addition, it is unclear as to how to determine uplink output power if the serving cell of the MS changes as a result of packet-switched handover, especially since such a packet-switched handover was not defined until 3GPP TS 45.008 Rel-6. Furthermore, accordingly to conventional practice, the MS cannot effectively respond to changing communication environment, and consequently, cannot use optimum output power, cannot converse battery power, and cause unnecessary inter-cell interference.

As discussed, the MS can operate in wireless systems, such as GSM/GPRS/EDGE RAN, and to calculate uplink output power, the following equation can be used.

$$P_{CH}=\min(\Gamma_0-\Gamma_{CH}-\alpha*(C+48), PMAX) \quad \text{[Equation 5]}$$

Referring to Equation 5, $\Gamma_{CH}$, $\Gamma_0$, $\alpha$, and PMAX are control information necessary to determining the MS output power, and the C value is the normalized received signal level at the MS. Here, $\Gamma_{CH}$, $\Gamma_0$, $\alpha$, and PMAX are control information can be considered variables defined in 3GPP TS 44.060, 3GPP TS 44.018, and 10.2.3.1 of 3GPP TS 45.008.

More specifically, $\Gamma_{CH}$ is a MS channel specific channel control parameter, sent to the MS in a radio link control (RLC) message. Moreover, $\Gamma_0$ is power value determined according to frequency bandwidth of the wireless system. Another control information, $\alpha$, is a system parameter, broadcast on PBCCH or optionally sent to MS in an RLC message. Furthermore, PMAX is the maximum allowed output in the cell, determined according to frequency bandwidth of each system of a cell.

In Equation 5, $\Gamma_0$ and PMAX are constants, and $\Gamma_{CH}$ and $\alpha$ are determined by the RLC control message. Therefore, by calculating the C value, the MS can the uplink output power, $P_{CH}$.

In an embodiment of the present invention, the MS can be fixed in a cell (or does not change cells) and the frequency used by the MS remains the same. In such a case, the C value would continue to be filtered using the running average filter with the current index n. The assumption here is that the MS is in a packet transfer mode.

In another embodiment of the present invention, the MS can be fixed in a cell (or does not change cells) but the frequency used by the MS can change. That is, the MS can be assigned a different frequency to use. In such a case, the received signal may experience a different radio environment and the received signal strength may be changed drastically due to change in the frequency. Therefore, the MS can re-start the running average filter with n=1 in order to newly calculate the C value.

However, because the C value is based on the downlink signal whose frequency band is above 45 MHz rather than uplink signal frequency band, the effect or influence of the frequency change may be negligible and may be ignored. As such, alternatively, the MS may continue to apply the previous C value to the running average filter with the current n. A more detailed discussion of this will be provided below with respect to Method(1) and Method(2). In this embodiment, the assumption is that the MS is in a packet transfer mode.

Referring to both embodiments, in order to determine the C value in the packet transfer mode, the BCCH carrier and/or the PDCH carrier can be used. Here, the network entity can determine which of the two channels (i.e., the BCCH or the PDCH) to measure. More specifically, the MS can determine whether to measure either the BCCH or the PDCH according to PC_MEAS_CHAN parameter set by the network entity. This parameter is transmitted to the MS from the network entity.

If PC_MEAS_CHAN=0, the received signal level of the BCCH of the serving cell can be measured. Alternatively, if PC_MEAS_CHAN=1, the MS does not measure the BCCH and instead measures the PDCH to determine the C value. Furthermore, if the frequency for transmitting data changes while the MS is in the packet transfer mode, the received signal level of the PDCH can be measured and used to calculate the C value.

After the frequency change, the MS in the packet transfer mode can continue to transmit/receive data using the frequency assigned/allocated by the network entity. This frequency assigned by the network entity can be affected by the changes in communication environment and/or in the network entity, and hence, a new frequency can be assigned to replace the previously assigned frequency.

In such a case, the network entity can assign a different or a new frequency via a packet assignment message, such as PACKET_DOWNLINK_ASSIGNMENT, PACKET_UPLINK_ASSIGNMENT, PACKET_TIMESLOT_RECONFIGURE, and PACKET_CS_RELEASE_INDICATION. Despite various packet assignment messages that can be used to assign frequency in response to the changing communication environment and/or network entity, for simplification, hereinafter, the PACKET_TIMESLOT_RECONFIGURE message will be used to describe frequency assignment.

Before starting with the discussion on the frequency assignment message, GSM/GPRS/EDGE wireless communication system frequency carrier allocation method will be discussed.

Figure 3:
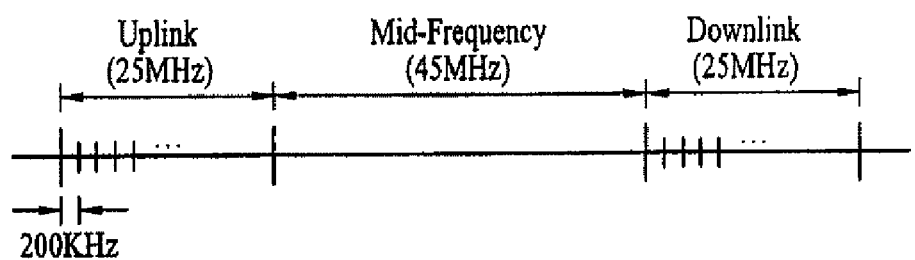
FIG. 3 is an exemplary diagram illustrating allocation of frequency bandwidths.

FIG. 3 is an exemplary diagram illustrating allocation of frequency bandwidths. Referring to FIG. 3, in the GSM/GPRS/EDGE wireless communication system, 25 MHz is allocated for the uplink and the downlink, and the uplink and the downlink are separated by 45 MHz. Furthermore, GSM/GPRS/EDGE wireless communication system is based on a time division multiple access (TDMA) scheme, and channels having 200 KHz bandwidth are assigned to the MS. Moreover, up to 1024 frequency carriers can be allocated to the MS by the network entity.

When the network entity assigns packet channels to be used by the MS in packet transfer mode, variable values necessary for determining the frequency value and the uplink output power are transmitted via the PACKET_TIMESLOT_RECONFIGURE message. The PACKET_TIMESLOT_RECONFIGURE message can include a list of frequency parameters as well as a list of dynamic allocation. The following table is an example of the PACKET_TIMESLOT_RECONFIGURE message.

TABLE 1

```
< Packet Timeslot Reconfigure message content > ::=
    < PAGE MODE : bit(2) >
    { 0 <GLOBAL_TFI : < Global TFI IE > >
        { 0
            { < CHANNEL_CODING_COMMAND : bit(2) >
                < Global Packet Timing Advance : <Global Packet Timing Advance IE > >
                < DOWNLINK_RLC_MODE : bit(1) >
                < CONTROL_ACK : bit(1) >
```

TABLE 1-continued

```
{ 0|1 <DOWNLINK_TFI_ASSIGNMENT : bit(5) > }
{ 0|1 <UPLINK_TFI_ASSIGNMENT : bit(5) > }
< DOWNLINK_TIMESLOT_ALLOCATION : bit(8) >
{ 0|1 <Frequency Parameters : < Frequency Parameters IE > > }
0
< Dynamic Allocation : < Dynamic Allocation struct > >
    .
    .
    .
```

As shown in Table 1, the frequency parameters can be used to define the frequency channels and/or a set of frequency channels to be used by the network entity and the MS. In detail, the frequency parameters further includes a sub-list or frequency parameters information elements (IE) parameter. The frequency parameters IE includes an absolute radio frequency channel number (ARFCN) which defines non-hopping radio frequency channels, indirect encoding which defines hopping radio frequency channels, direct encoding 1, and direct encoding 2. The ARFCN is a 10-bit binary field and further defined in 3GPP TS 45.005. More specifically, the ARFCN can be used to allocate 0-1023 absolute radio frequency identification(s).

Table 2 shows an example of the frequency parameters IE.

TABLE 2

```
< Frequency Parmeters IE > ::=
    < TSC : bit(3) >
    { 00 < ARFCN : bit(10) >
    | 01 < Indirect encoding : <Indirect encoding struct > >
    | 10 < Direct encoding 1 : <Direct encoding struct 1 > >
    | 11 < Direct encoding 2 : <Direct encoding struct 2 > > };
```

As discussed, the PACKET_TIMESLOT_RECONFIGURE message includes the list of dynamic allocation. The dynamic allocation parameter can be further described through a "dynamic allocation struct" parameter. That is, the dynamic allocation struct parameter can be used to allocate time slot(s) to be used by the MS in the frame of FIG. 1. An exemplary description of the "dynamic allocation struct" parameter is shown in Table 3.

TABLE 3

```
< Dynamic Allocation struct > ::=
    < EXTENDED_DYNAMIC_ALLOCATION : bit(1) >
    { 0|1 < P0 : bit(4) > }
        < PR_MODE : bit(1) >
    < USF_GRANUALARITY : bit(1) >
    0
    { 0|1 <TBF Starting Time : <Starting Frame Number
    Description IE>>}
    { 0
        { 0|1 < USF_TN0 : bit(3) > }
        { 0|1 < USF_TN1 : bit(3) > }
        { 0|1 < USF_TN2 : bit(3) > }
        { 0|1 < USF_TN3 : bit(3) > }
        { 0|1 < USF_TN4 : bit(3) > }
        { 0|1 < USF_TN5 : bit(3) > }
        { 0|1 < USF_TN6 : bit(3) > }
        { 0|1 < USF_TN7 : bit(3) > }
    | 1
        < ALPHA : bit(4) >
        { 0|1 < USF_TN0 : bit(3) > }
            < GAMMA_TN0 : bit(5) > }
        { 0|1 < USF_TN1 : bit(3) > }
            < GAMMA_TN1 : bit(5) > }
        { 0|1 < USF_TN2 : bit(3) > }
            < GAMMA_TN2 : bit(5) > }
```

TABLE 3-continued

```
        { 0|1 < USF_TN3 : bit(3) > }
            < GAMMA_TN3 : bit(5) > }
        { 0|1 < USF_TN4 : bit(3) > }
            < GAMMA_TN4 : bit(5) > }
        { 0|1 < USF_TN5 : bit(3) > }
            < GAMMA_TN5 : bit(5) > }
        { 0|1 < USF_TN6 : bit(3) > }
            < GAMMA_TN6 : bit(5) > }
        { 0|1 < USF_TN7 : bit(3) > }
            < GAMMA_TN7 : bit(5) > } };
```

After receiving notification of the frequency change via the PACKET_TIMESLOT_RECONFIGURE message, the MS can measure the downlink power and use thin information on the measured downlink power (hereinafter referred to as "downlink power information) to determine the uplink output power. Here, the downlink power information can be in form of the normalized received signal level or more specifically, the normalized C value of the radio block.

At this stage, a new or different frequency for the MS has been assigned due to changes in the communication environment/condition or in the network entity. Thereafter, as discussed, the next step is for the MS to determine the uplink output power using the downlink power information.

As discussed, as a method of determining uplink output power, Method(1) and Method(2) can be used. More specifically, in Method(1), the MS can continue to use the downlink power information measured prior to the frequency change to determine the uplink output power, and in Method(2), the MS can determine the uplink output power anew after the frequency change.

Figure 4:
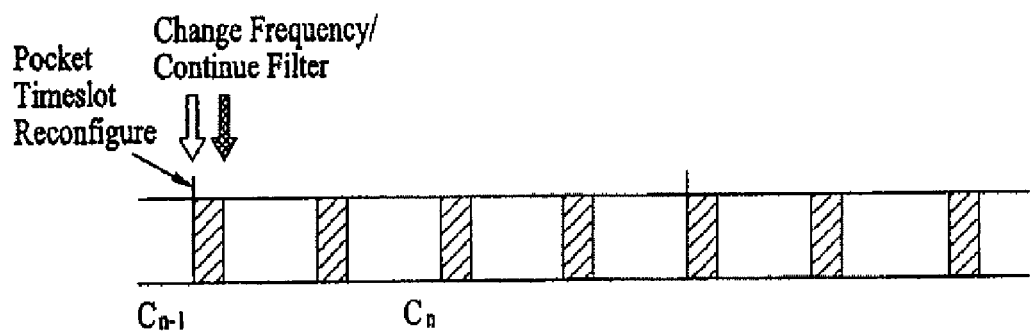
FIG. 4 is an exemplary diagram illustrating filtering using $C_{n-1}$ after the MS changes the frequency.

FIG. 4 is an exemplary diagram illustrating filtering using $C_{n-1}$ after the frequency change. The detailed discussion of this figure is discussed above with respect to Method(1).

According to Method(1), the MS can first receive the notification regarding change in frequency for transmitting data via the PACKET_TIMESLOT_RECONFIGURE message. Thereafter, the MS can change the frequency to the assigned frequency included in the message. After changing the frequency, the MS can measure the PDCH power and calculate downlink power by applying the corresponding received signal level of the measurement samples, $SS_n$, to Equation 1. That is, the normalized C value, $C_{block,n}$, can be calculated from Equation 1. Furthermore, the MS can determine $C_n$, with respect to the changed frequency, by applying to Equation 4 the calculated $C_{block,n}$ and $C_{n-1}$, which was calculated prior to change in frequency.

In other words, the MS can continue to use $C_{n-1}$, calculated before the frequency change, and perform filtering on $C_{block,n}$, calculated after the frequency change, in determining $C_n$. Thereafter, $C_n$ can be applied to Equation 5 to determine the uplink output power, $P_{CH}$, in the post-frequency change environment.

According to Method(2), the MS can receive the notification regarding change in frequency for data transmission via the PACKET_TIMESLOT_RECONFIGURE message. Thereafter, the MS can change the frequency to the assigned frequency included in the message. After changing the frequency, the MS can measure the PDCH power and calculate the downlink power information by applying the corresponding received signal level of the measurement samples, $SS_n$, to Equation 1. That is, the normalized C value, $C_{block,n}$, can be calculated from Equation 1. These processes are same as those of Method(1).

However, in Method(2), the calculated value, $C_{block,n}$, can be applied to Equation 4, starting with n=1. Consequently, $C_n$ can be determined anew, starting from $C_1$, which is different from Method(1). In other words, $C_{n-1}$, which was calculated before the frequency change, is not considered, and filtering process is re-started with n=1 for $C_{block,n}$, which is calculated after the frequency change, to determine $C_n$ in the changed frequency environment. In short, the filter can be re-started with n=1 for the first sample at every cell change.

In Method (2), the uplink output power can be determined based on time (or a point) in which the PACKET_TIMESLOT_RECONFIGURE message is received, time (or a point) in which the frequency is changed, and/or time (or a point) in which filtering is performed.

Hereafter, FIGS. 5A-5D will describe various methods related to determining uplink output power according to Method(2) as well as the filtering process.

Figure 5A:
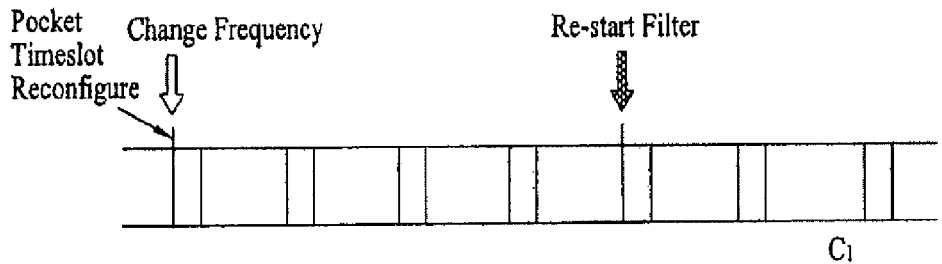
FIGS. 5A-5D are exemplary diagrams illustrating filtering re-start after the frequency change.

FIG. 5A is an exemplary diagram illustrating filtering re-start after the frequency change. Referring to FIG. 5A, the MS changes the frequency upon receipt of the PACKET_TIMESLOT_RECONFIGURE message. However, filtering does not necessary have to start at the same time. That is, filtering of the C value can start on the second ($2^{nd}$) wireless block of a subsequent frame, following the frame in which the message is received. Here, the first frame is marked by the receipt of the message and the frequency change, and the subsequent frame can be indicated by the end of the first frame.

Figure 5B:
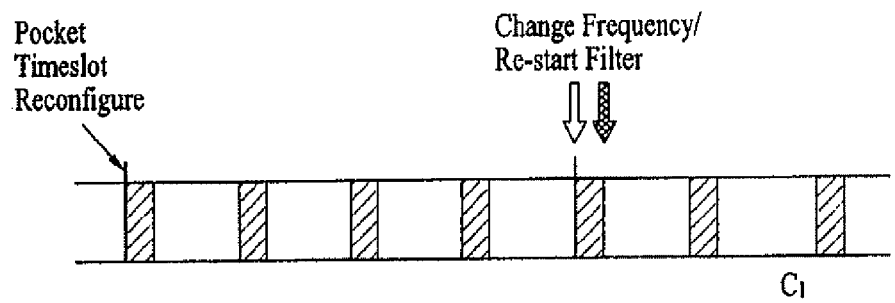

FIG. 5B is another exemplary diagram illustrating filtering re-start after the frequency change. Referring to FIG. 5B, the MS receives the PACKET_TIMESLOT_RECONFIGURE message in the first frame. Thereafter, the frequency is changed and the filtering of the C value is re-started on the second ($2^{nd}$) wireless block of a subsequent frame, following the frame in which the message is received.

Figure 5C:
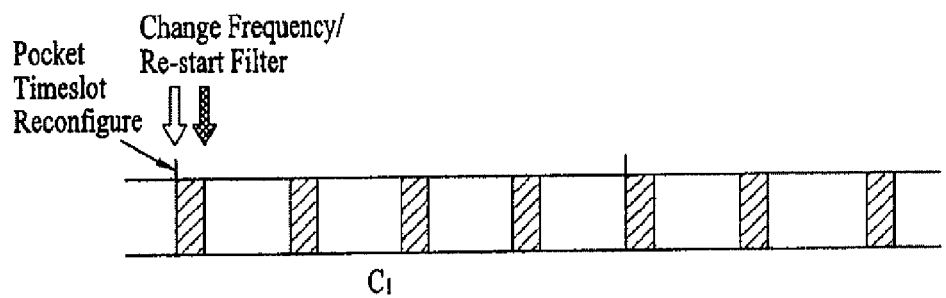

FIG. 5C is another exemplary diagram illustrating filtering re-start after the frequency change. Referring to FIG. 5C, the MS changes the frequency upon receipt of the PACKET_TIMESLOT_RECONFIGURE message, and the filtering of the C value is re-started as well in the same frame (i.e., first frame in which the message is received).

Figure 5D:
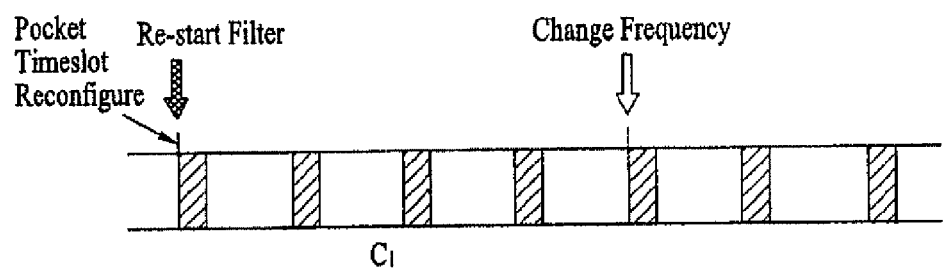

FIG. 5D is another exemplary diagram illustrating filtering re-start after the frequency change. Referring to FIG. 5D, the MS re-starts filtering upon receipt of the PACKET_TIMESLOT_RECONFIGURE message in the first frame. However, the MS does not change the frequency until two (2) wireless blocks after the frame which received the message. Here, the C value can be calculated upon receipt of the message.

In the embodiments of above, the MS remained in the cell, and the same or a new frequency was assigned. However, in the following embodiment, the MS can change cells. In other words, the cell changes for the MS. Here, as before, the assumption is that the MS is in a packet transfer mode.

The MS can change from one cell to another cell, for example, by packet-switched (PS) handover or by cell re-selection. Along with the cell change, the frequency is changed as well. As such, detailed descriptions regarding to operations after the cell change can be referred to the embodiment of above.

As discussed in the previous embodiments, in which the previously obtained C value can be applied to the running average filter, in the current embodiment, the running average filter can be re-started with n=1 for calculating the uplink output power. A more detailed discussion of this will be provided below.

Figure 6A:
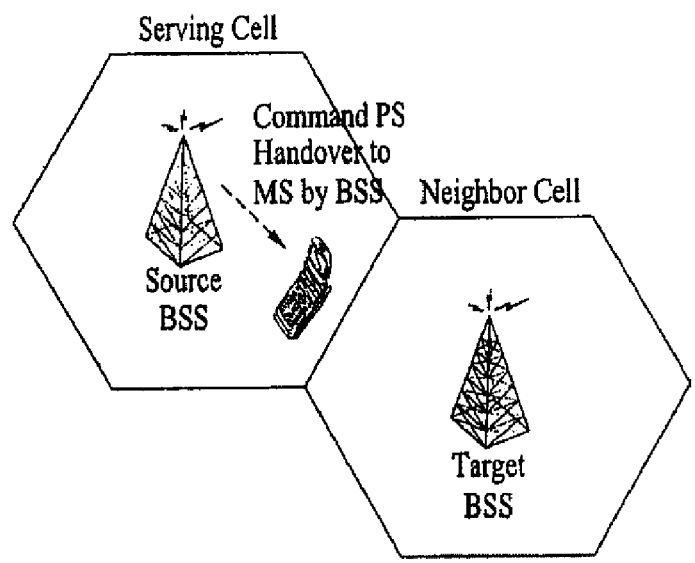
FIG. 6A is an exemplary diagram illustrating a packet-switched (PS) handover from a serving cell to a neighboring cell.

FIG. 6A is an exemplary diagram illustrating a cell change from a serving cell to a neighboring cell. In FIG. 6A, the MS receives a command message from the source cell to execute cell change (e.g., PS handover or cell re-selection) to a target cell. After the MS completes the cell change to the target cell according to the command message, the MS can calculate the uplink output power using following two (2) methods. Here, the MS is assumed to perform PS handover during packet transfer mode. It is possible for the MS to change cells via a different operation such as cell re-selection.

According to a first method, the MS in the packet transfer mode can measure the power of the BCCH carrier and calculate the uplink output power using the measured power of the BCCH carrier. According to a second method, the MS in the packet transfer mode can measure the power of the PDCH carrier and calculate the uplink output power using the measured power of the PDCH carrier.

Figure 6B:
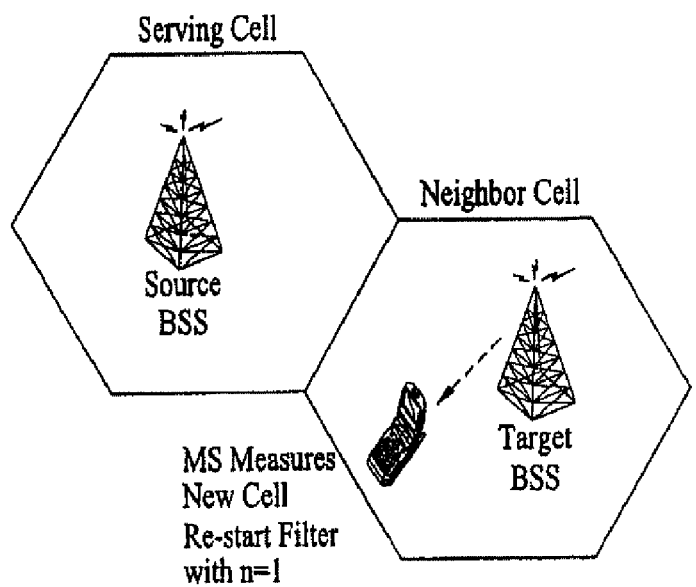
FIG. 6B is an exemplary diagram illustrating filtering re-start after moving to a new cell.

FIG. 6B is an exemplary diagram illustrating filtering re-start after moving to a new cell. Referring to FIG. 6B, after the cell change from the source cell to the target cell, the MS can measure the power of the downlink transmission channel or of the BCCH (or $SS_n$). The MS can then re-start filtering by applying the measured $SS_n$ to a prescribed equation (e.g., Equation 3) to determine the uplink output power. Here, a running average filter such as Equation 3 can be used, starting with n=1. In other words, the uplink output power can be calculated using the measured power information from the target cell, and by re-starting the filter with n=1.

With respect to measuring the power of the PDCH, after the MS moves (or cell change) from the source cell to the target cell, the MS can measure the downlink power of the PDCH and apply the measured downlink power to a prescribed equation (e.g., Equation 4) to calculate the uplink output power. Here, the difference with the first method is that the power of the PDCH is measured instead of the power of the BCCH. Here, the running average filter as in Equation 4 can be used. The uplink output power is a normalized C value or $C_{block,n}$. Same as in the first method, the uplink output power can be calculated using the power information measured from the target cell, and the filtering process can be re-started with n=1.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of calculating uplink output power in a wireless communication system, the method comprising:
receiving a message which includes a command to a mobile station (MS) to perform a handover from a first cell, the first cell serving as a current serving cell, to a target cell, which is one of one or more neighbor cells;
performing the handover to the target cell according to the message in a packet transfer mode;

measuring, by the MS, a power of a broadcast control channel (BCCH) in the target cell after the MS is handed over to the target cell; and calculating the uplink output power by re-starting a running average filter that considers only the measured power without previously measured powers from the first cell when the measured power is used to perform an initial calculation of the uplink output power after the MS is handed over to the target cell, wherein the running average filter is represented by $C_n = (1-b)*C_{n-1}+b*SS_n$, where $SS_n$ denotes the measured power of the BCCH, b denotes a forgetting factor, and n is an iteration index.

2. The method of claim 1, wherein the iteration index is reset as n=1 after the MS moves to the target cell, and if n=1, then b=1.

3. The method of claim 1, further comprising receiving a system information message which includes a power control measurement channel (PC_MEAS_CHAN) parameter for instructing the MS to measure the BCCH.

4. A method of calculating uplink output power for cell re-selection in a wireless communication system, the method comprising:

changing a serving cell of a mobile station (MS) from a first cell, the first cell serving as a current serving cell, to a target cell, which is one of one or more neighbor cells;

measuring, by the MS, a power of a packet data channel (PDCH) in the target cell after changing the serving cell from the first cell to the target cell; and calculating the uplink output power by re-starting a running average filter that considers only the measured power without previously measured powers from the first cell when the measured power is used to perform an initial calculation of the uplink output power after changing the serving cell from the first cell to the target cell, wherein the running average filter is represented by $C_n = (1-c)*C_{n-1}+c*C_{block,n}$, where $C_{block,n}$ denotes a sum of the measured power of the PDCH and a base station subsystem (BSS) output power reduction, c denotes a forgetting factor, and n is an iteration index.

5. The method of claim 4, wherein the iteration index is reset as n=1 after the MS moves to the target cell, and if n=1, then b=1.

6. The method of claim 4, further comprising receiving a system information message which includes a power control measurement channel (PC_MEAS_CHAN) parameter for instructing the MS to measure the PDCH.

7. A mobile station (MS) for calculating uplink output power in a wireless communication system, the MS comprising:

a reception module configured to receive a message which includes a command to perform a handover from a first cell, the first cell serving as a current serving cell, to a target cell, which is one of one or more neighbor cells; and a processor configured to:

perform the handover to the target cell according to the message in a packet transfer mode;

measure a power of a broadcast control channel (BCCH) in the target cell after the MS is handed over to the target cell; and calculate the uplink output power by re-starting a running average filter that considers only the measured power without previously measured powers from the first cell when the measured power is used to perform an initial calculation of the uplink output power after the MS is handed over to the target cell, and wherein the running average filter is represented by $C_n = (1-b)*C_{n-1}+b*SS_n$, where $SS_n$ denotes the measured power of the BCCH, b denotes a forgetting factor, and n is an iteration index.

8. The mobile station of claim 7, wherein the iteration index is reset as n=1 after the MS moves to the target cell, and if n=1, then b=1.

9. The mobile station of claim 7, wherein the reception module is further configured to receive a system information message which includes a power control measurement channel (PC_MEAS_CHAN) parameter for instructing the MS to measure the BCCH.

10. A mobile station (MS) for calculating uplink output power for cell re-selection in a wireless communication system, the MS comprising:

a running average filter; and a processor configured to:

change a serving cell from a first cell, the first cell serving as a current serving cell, to a target cell, which is one of one or more neighbor cells;

measure a power of a packet data channel (PDCH) in the target cell after changing the serving cell from the first cell to the target cell; and calculate the uplink output power by re-starting the running average filter that considers only the measured power without previously measured powers from the first cell when the measured power is used to perform an initial calculation of the uplink output power after changing the serving cell from the first cell to the target cell, and wherein the running average filter is represented by $C_n = (1-c)*C_{n-1}+c*C_{block,n}$, where $C_{block,n}$ denotes a sum of the measured power of the PDCH and a base station subsystem (BSS) output power reduction, c denotes a forgetting factor, and n is an iteration index.

11. The mobile station of claim 10, wherein the iteration index is reset as n=1 after the MS moves to the target cell, and if n=1, then b=1.

12. The mobile station of claim 10, wherein the MS is further configured to receive a system information message which includes a power control measurement channel (PC_MEAS_CHAN) parameter for instructing the MS to measure the PDCH.

* * * * *